US012797166B2

(12) United States Patent
Moalem et al.

(10) Patent No.: US 12,797,166 B2
(45) Date of Patent: Nov. 17, 2026

(54) SYSTEMS AND METHODS FOR ESTIMATING LIGHT CHARACTERISTICS OF A VISIBLE LIGHT VOLUMETRIC MODEL

(71) Applicant: Align Technology, Inc., San Jose, CA (US)

(72) Inventors: Yosi Moalem, Ness Ziona (IL); Gilad Elbaz, Tel Aviv (IL); Ofer Saphier, Rehovot (IL); Maayan Moshe, Ra'anana (IL); Shai Ayal, Shoham (IL); Doron Malka, Tel Aviv (IL)

(73) Assignee: Align Technology, Inc., San Jose, CA (US)

( * ) Notice: Subject to any disclaimer, the term of this patent is extended or adjusted under 35 U.S.C. 154(b) by 103 days.

(21) Appl. No.: 18/732,551

(22) Filed: Jun. 3, 2024

(65) Prior Publication Data

US 2024/0315817 A1 Sep. 26, 2024

Related U.S. Application Data

(63) Continuation-in-part of application No. 18/183,912, filed on Mar. 14, 2023, now Pat. No. 11,998,410, which is a continuation of application No. 16/046,897, filed on Jul. 26, 2018, now Pat. No. 11,633,268.

(60) Provisional application No. 62/662,961, filed on Apr. 26, 2018, provisional application No. 62/537,941, filed on Jul. 27, 2017.

(51) Int. Cl.

| | |
|---|---|
| ***A61C 13/08*** | (2006.01) |
| ***A61C 9/00*** | (2006.01) |
| ***A61C 13/00*** | (2006.01) |
| ***G06T 15/08*** | (2011.01) |
| ***G06T 17/00*** | (2006.01) |
| *A61C 13/09* | (2006.01) |

(52) U.S. Cl.

CPC .......... *A61C 13/082* (2013.01); *A61C 9/0053* (2013.01); *A61C 13/0004* (2013.01); *G06T 15/08* (2013.01); *G06T 17/00* (2013.01); *A61C 13/0019* (2013.01); *A61C 13/09* (2013.01); *G06T 2210/41* (2013.01)

(58) Field of Classification Search

None

See application file for complete search history.

(56) References Cited

U.S. PATENT DOCUMENTS

| | | | |
|---|---|---|---|
| 6,334,772 | B1 | 1/2002 | Taub et al. |
| 6,334,853 | B1 | 1/2002 | Kopelman et al. |
| 6,463,344 | B1 | 10/2002 | Pavlovskaia et al. |
| 6,542,249 | B1 | 4/2003 | Kofman et al. |
| 6,633,789 | B1 | 10/2003 | Nikolskiy et al. |

(Continued)

FOREIGN PATENT DOCUMENTS

| | | |
|---|---|---|
| CN | 102579148 A | 7/2012 |

*Primary Examiner* — Andrew G Yang

(74) *Attorney, Agent, or Firm* — Shay Glenn LLP

(57) ABSTRACT

Systems and computer-readable media for estimating the light characteristics for visible light volumetric models. The estimated light characteristics can be based on optical properties of a patient's tooth. The optical properties can be associated with voxels on an outer surface of the patent's tooth as well as a region of enamel extending from the outer surface toward the dentine. Dental restorations may be formed based on the visible light volumetric model.

24 Claims, 6 Drawing Sheets

(56) References Cited

U.S. PATENT DOCUMENTS

| | | | |
|---|---|---|---|
| 6,664,986 | B1 | 12/2003 | Kopelman et al. |
| 6,979,196 | B2 | 12/2005 | Nikolskiy et al. |
| 7,030,383 | B2 | 4/2006 | Babayoff et al. |
| 7,202,466 | B2 | 4/2007 | Babayoff et al. |
| 7,255,558 | B2 | 8/2007 | Babayoff et al. |
| 7,319,529 | B2 | 1/2008 | Babayoff |
| 7,373,286 | B2 | 5/2008 | Nikolskiy et al. |
| 7,507,088 | B2 | 3/2009 | Taub et al. |
| 7,545,372 | B2 | 6/2009 | Kopelman et al. |
| 7,916,911 | B2 | 3/2011 | Kaza et al. |
| 8,244,028 | B2 | 8/2012 | Kuo et al. |
| D742,518 | S | 11/2015 | Barak et al. |
| D760,901 | S | 7/2016 | Barak et al. |
| 9,393,087 | B2 | 7/2016 | Moalem |
| 9,408,679 | B2 | 8/2016 | Kopelman |
| 9,431,887 | B2 | 8/2016 | Boltanski |
| 9,451,873 | B1 | 9/2016 | Kopelman et al. |
| D768,861 | S | 10/2016 | Barak et al. |
| D771,817 | S | 11/2016 | Barak et al. |
| 9,491,863 | B2 | 11/2016 | Boltanski |
| D774,193 | S | 12/2016 | Makmel et al. |
| 9,668,829 | B2 | 6/2017 | Kopelman |
| 9,717,402 | B2 | 8/2017 | Lampert et al. |
| 9,844,426 | B2 | 12/2017 | Atiya et al. |
| 10,076,389 | B2 | 9/2018 | Wu et al. |
| 10,098,714 | B2 | 10/2018 | Kuo |
| 10,108,269 | B2 | 10/2018 | Sabina et al. |
| 10,111,581 | B2 | 10/2018 | Makmel |
| 10,111,714 | B2 | 10/2018 | Kopelman et al. |
| 10,136,972 | B2 | 11/2018 | Sabina et al. |
| 10,390,913 | B2 | 8/2019 | Sabina et al. |
| 10,499,793 | B2 | 12/2019 | Ozerov et al. |
| 10,507,087 | B2 | 12/2019 | Elbaz et al. |
| 10,517,482 | B2 | 12/2019 | Sato et al. |
| 10,695,150 | B2 | 6/2020 | Kopelman et al. |
| 10,708,574 | B2 | 7/2020 | Furst et al. |
| 10,813,727 | B2 | 10/2020 | Sabina et al. |
| 10,888,399 | B2 | 1/2021 | Kopelman et al. |
| 10,952,816 | B2 | 3/2021 | Kopelman |
| 10,980,613 | B2 | 4/2021 | Shanjani et al. |
| 11,013,581 | B2 | 5/2021 | Sabina et al. |
| D925,739 | S | 7/2021 | Shalev et al. |
| 11,096,765 | B2 | 8/2021 | Atiya et al. |
| 11,238,586 | B2 | 2/2022 | Minchenkov et al. |
| 11,367,192 | B2 | 6/2022 | Kopelman et al. |
| 11,455,727 | B2 | 9/2022 | Minchenkov et al. |
| 11,478,132 | B2 | 10/2022 | Kopelman et al. |
| 11,563,929 | B2 | 1/2023 | Saphier et al. |
| 11,707,238 | B2 | 7/2023 | Moshe et al. |
| RE49,605 | E | 8/2023 | Kopelman |
| 11,744,681 | B2 | 9/2023 | Avi et al. |
| 11,759,277 | B2 | 9/2023 | Shalev et al. |
| 11,896,461 | B2 | 2/2024 | Saphier et al. |
| 11,937,996 | B2 | 3/2024 | Peleg |
| 11,995,839 | B2 | 5/2024 | Weiss et al. |
| 2010/0119996 | A1* | 5/2010 | Kaigler, Sr. ........ A61C 13/0013 433/215 |
| 2011/0212419 | A1 | 9/2011 | Schweiger |
| 2012/0065755 | A1* | 3/2012 | Steingart ................ B33Y 30/00 700/98 |
| 2015/0196372 | A1* | 7/2015 | Champleboux ........ A61B 34/10 433/29 |
| 2017/0011535 | A1* | 1/2017 | Abkai ..................... G06T 12/30 |
| 2017/0319308 | A1* | 11/2017 | Moon .................... A61C 19/04 |
| 2021/0121049 | A1 | 4/2021 | Rudnitsky et al. |
| 2021/0137653 | A1 | 5/2021 | Saphier et al. |
| 2021/0196152 | A1 | 7/2021 | Saphier et al. |

* cited by examiner

SYSTEMS AND METHODS FOR ESTIMATING LIGHT CHARACTERISTICS OF A VISIBLE LIGHT VOLUMETRIC MODEL

CROSS REFERENCE TO RELATED APPLICATIONS

This patent application claims priority as a continuation-in-part to U.S. patent application Ser. No. 18/183,912, filed on Mar. 14, 2023 (now U.S. Pat. No. 11,998,410), which is a continuation of U.S. patent application Ser. No. 16/046,897, filed Jul. 26, 2018 (now U.S. Pat. No. 11,633,268), which claims priority to U.S. Provisional Patent Application No. 62/537,941, filed on Jul. 27, 2017, titled "TOOTH SHADING, TRANSPARENCY AND GLAING," and to U.S. Provisional Patent Application No. 62/662,961, filed on Apr. 26, 2018, titled "TOOTH SHADING, TRANSPARENCY AND GLAZING." each of which is herein incorporated by reference in its entirety.

This patent application also references U.S. patent application Ser. No. 15/662,234, titled "INTRAORAL SCANNER WITH DENTAL DIAGNOSTICS CAPABILITIES," filed on Jul. 27, 2017, which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Reconstructing the accurate visual appearance of teeth for implants, teeth reconstruction and veneers is a challenge for the teeth restoration industry. Matching one or more implants (e.g., artificial restorations such as dentures, veneers, etc.) to a patient's natural dentition can be a difficult, and may require communication between the dentist or dental technician and possibly a separate laboratory. It is difficult to duplicate natural appearance in ceramics particularly when relying on a clinician to describe or fully illustrate what he or she sees in a shade-matching process. Typically, the first part of the process may be to define the colors, shades and transparency for the original teeth. However, attempting to define color for opaque surfaces is particularly complex, due to the transparency of the teeth and the inner structures of the teeth that contains materials having different optical properties, for example enamel and dentin.

Traditionally, tooth shading is typically performed by external acquiring the tooth surface appearance, using RGB or spectral sensors. Typically, such measurements may give 1-3 color regions per tooth, and define up to approximately 20 shades. Additionally, tooth color restoration may be performed using SLR cameras to take images that may be compared manually to a reference shade palette, and the fine coloring of the tooth implant is typically done manually to resemble the image, without any digital detailed data involved in the process.

In a restorative treatment, the restorative implant (e.g., crown, bridge, etc.) may require information for the tooth/teeth color map, shading, and the transparency, so that the resulting implant may have the appropriate glazing.

Described herein are methods, systems and/or computer-readable media that may address the issues raised above.

SUMMARY OF THE DISCLOSURE

Described herein are methods and apparatuses (e.g., systems, devices, including, e.g. non-transitory computer readable medium storing instructions for execution by a processor) for preparing a dental restoration that has optical properties that are optimally matched to the properties of a patient's tooth and/or adjacent teeth. These methods and apparatuses may use near-infrared imaging in combination with visible light imaging in an intraoral scanner to generate a volumetric model to provide dental restorations having superior optical properties. The combination of visible light and near-infrared imaging may allow the apparatus to determine both structural and optical properties of both the outer and inner regions of the teeth in a manner that has not previously been possible.

For example, described herein are non-transitory computer readable medium storing instructions for execution by a processor for preparing a dental restoration having optical properties matching optical properties of a patient's tooth, wherein the instructions, when executed, cause the processor to: generate a volumetric model of at least a portion of the patient's tooth from a three-dimensional (3D) intraoral scan including both near-IR wavelength data and visible light wavelength data, wherein the volumetric model includes a representation of an outer surface of the patient's tooth and an internal structure of a region of enamel extending from the outer surface of the patient's tooth to the patient's dentine; estimate values for one or more of: light absorption, light reflection, light transmission, and light scattering of one or more visible light wavelengths for voxels defining the outer surface of the patient's tooth and the region of enamel extending from the outer surface of the patient's tooth to the patient's dentine; generate a visible light volumetric model from the volumetric model by assigning the estimated values to voxels of the visible light volumetric model that correspond to the volumetric model.

The instructions may cause the processor to form the dental restoration from the visible light volumetric model. The instructions may cause the processor to make the dental restoration by generating instructions for making the dental restoration from the visible light volumetric model wherein the dental restoration has surface and internal optical properties derived from the visible light volumetric model. In some cases the instructions cause the processor to receive the volumetric model of at least the portion of the patient's tooth, wherein the volumetric model comprises a plurality of voxels defining the outer surface of the patient's tooth and the region of enamel extending from the outer surface of the patient's tooth to the patient's dentine. The instructions may cause the processor to estimate values for two or more of: light absorption, light reflection, light transmission, and light scattering for each of the plurality of voxels defining the outer surface of the patient's tooth and the region of enamel extending from the outer surface of the patient's tooth to the patient's dentine. In some cases the instructions may cause the processor to estimate values for one or more of: light absorption, light reflection, light transmission, and light scattering at three or more visible light wavelengths for each of the plurality of voxels defining the outer surface of the patient's tooth and the region of enamel extending from the outer surface of the patient's tooth to the patient's dentine. For example, the three or more visible light wavelengths include one or more red, green and blue wavelength.

In any of these apparatuses the instructions may cause the processor to estimate the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value. The instructions may cause the processor to set the values for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine to a predetermined prior value determined by parametric estimation. The instructions may cause the processor to estimate the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by iterating to determine the value that approximates optical properties based on the position of the camera and the reconstructed volume compared to RGB data recorded when scanning the patient's teeth with an intraoral scanner to generate the volumetric model. The instructions may cause the processor to estimate the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value determined from a population of representative patients, wherein the prior value is selected using one or more of: measured RGB data recorded when scanning the patient's teeth with an intraoral scanner to generate the volumetric model, volume information, and patient information.

In any of these apparatuses and methods, the volume information may include path length from the surface of the tooth to the dentin through the enamel. The patient information may comprise one or more of: patient age, gender, estimated jaw shape. The instructions may cause the processor to divide the volumetric model into a plurality of sub-regions before estimating the value for one or more of: light absorption, light reflection, light transmission, and light scattering of one or more visible light wavelengths for the outer surface of the patient's tooth and the region of enamel extending from the outer surface of the patient's tooth to the patient's dentine.

Also described herein are non-transitory computer readable medium storing instructions for execution by a processor for preparing a dental restoration having optical properties matching optical properties of a patient's tooth, wherein the instructions, when executed, may cause the processor to: form a visible light volumetric model from intraoral scan data, the intraoral scan data comprising near-infrared (NIRI) data, wherein the visible light volumetric model is formed by: estimating values for one or more of: light absorption, light reflection, light transmission, and light scattering of one or more visible light wavelengths, for voxels of the visible light volumetric model associated with the region of enamel extending from the outer surface of the patient's tooth to the patient's dentine based on NIRI data; and estimating values for one or more of: light absorption, light reflection, light transmission, and light scattering of one or more visible light wavelengths, for voxels of the visible light volumetric model associated with the outer surface of the patient's tooth based on visible light wavelength data; and form the dental restoration from the visible light volumetric model.

Also described herein are systems including any of these instructions. For example, described herein are systems, comprising: an intraoral scanner; one or more processors; and a memory comprising instructions for execution by the one or more processors for preparing a dental restoration having optical properties matching optical properties of a patient's tooth, wherein the instructions, when executed, cause the one or more processors to: generate a volumetric model of at least a portion of the patient's tooth from a three-dimensional (3D) intraoral scan including both near-IR wavelength data and visible light wavelength data, wherein the volumetric model includes a representation of an outer surface of the patient's tooth and an internal structure of a region of enamel extending from the outer surface of the patient's tooth to the patient's dentine; estimate values for one or more of: light absorption, light reflection, light transmission, and light scattering of one or more visible light wavelengths for voxels defining the outer surface of the patient's tooth and the region of enamel extending from the outer surface of the patient's tooth to the patient's dentine; generate a visible light volumetric model from the volumetric model by assigning the estimated values to voxels of the visible light volumetric model that correspond to the volumetric model.

The instructions may cause the one or more processors to form the dental restoration from the visible light volumetric model. The instructions may cause the one or more processors to make the dental restoration by generating instructions for making the dental restoration from the visible light volumetric model wherein the dental restoration has surface and internal optical properties derived from the visible light volumetric model. In some cases the instructions may cause the one or more processors to receive the volumetric model of at least the portion of the patient's tooth, wherein the volumetric model comprises a plurality of voxels defining the outer surface of the patient's tooth and the region of enamel extending from the outer surface of the patient's tooth to the patient's dentine. For example, the instructions may cause the one or more processors to estimate the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value. In some cases the instructions cause the one or more processors to set the values for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine to a predetermined prior value determined by parametric estimation.

Any of the instructions may cause the one or more processors to estimate the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by iterating to determine the value that approximates optical properties based on the position of the camera and the reconstructed volume compared to RGB data recorded when scanning the patient's teeth with an intraoral scanner to generate the volumetric model. In some cases the instructions cause the one or more processors to estimate the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value determined from a population of representative patients, wherein the prior value is selected using one or more of: measured RGB data recorded when scanning the patient's teeth with an intraoral scanner to generate the volumetric model, volume information, and patient information. The instructions may cause the one or more processors to divide the volumetric model into a plurality of sub-regions before estimating the value for one or more of: light absorption, light reflection, light transmission, and light scattering of one or more visible light wavelengths for the outer surface of the patient's tooth and the region of enamel extending from the outer surface of the patient's tooth to the patient's dentine.

The systems, methods, and/or computer-readable media described herein provide technical solutions to the highly technical problems of machine generation of dental restorations. In particular, these systems, methods and/or computer readable media may provide technical solutions to aid in the creation of dental restorations that more closely resemble a natural tooth (including its internal optical structure). These systems, methods and/or computer readable media may help in virtually rendering a tooth, including its internal optical structure, and apply these renderings (e.g., digital models) to the fabrication of the dental restoration.

The methods and apparatuses described herein may relate to dental implants (e.g., restorations such as artificial teeth, caps, dentures, veneers, bridges, etc.) having more life-like coloring, shading and transparency. Specifically, described herein are methods of making dental implant using an optical scanner that generates a model of the patient's teeth including a three-dimensional surface representation and a 3D volumetric model (showing internal features, including contours, density, transparency, etc.), and color of the patient's teeth.

Any of the methods and apparatuses (systems, devices, etc., including software, hardware and/or firmware) described herein may be used to make a dental restoration for a patient, so that the dental restoration has optical properties that match optical properties of the patient's teeth. For example, the methods and apparatuses described herein may be used to create a visible light volumetric model that includes optical properties based on the patient's existing teeth in a three-dimensional context, and this visible light volumetric model may be used to generate a dental restoration using the optical properties of the visible light volumetric model. The optical properties are described for surface and internal volume of one or more teeth, which may be the teeth adjacent or similar to the tooth to be restored by the dental restoration. In some variations, a volumetric model of all or a portion of the dental restoration may be generated, and the optical properties of the dental restoration volumetric model may be derived from the visible light volumetric model.

In general, a dental restoration may include a restorative implant, such as a crown, veneer, bridges, and the like. Any of these restorative implants may include a glaze (e.g., a veneer, including a ceramic veneer) as part of the restoration, to simulate the dental enamel.

Any of the methods, systems, and/or computer readable media described herein may include or include the use of a three-dimensional (3D) oral scanner, which may also be referred to as an intraoral scanner. These method and apparatuses may be used with any appropriate intraoral scanner, but particularly those that scan in both near-IR and visible light, either separately (including sequentially) or concurrently/simultaneously. An example of an intraoral scanner that may be used is described, for example, in U.S. patent application Ser. No. 15/662,234, titled "INTRAORAL SCANNER WITH DENTAL DIAGNOSTICS CAPABILITIES", filed on Jul. 27, 2017.

A volumetric model typically refers to a digital representation of a three-dimensional space, e.g., a volume. In particular, described herein are volumetric models of all or a portion of a tooth. The volumetric model may generally be a solid model or a shell/boundary model. A volumetric model may be digital map representing a three-dimensional region; for example, the volumetric model may comprise voxels.

The method, systems and/or computer readable media described herein typically generate 3D volumetric models that include one or more optical properties of teeth as a part of the 3D volumetric model. Any optical property may be used, including: light absorption, light reflection, light transmission, and light scattering. Other optical properties may include hue, transparency, translucency, opalescence, chroma, value, luster and florescence. These optical properties may overlap and/or may be alternative expressions of each other and/or may be derived from other optical properties. For example, translucency may be expressed as a property of light scattering and light reflection.

In general, reflection, transmission and absorption may depend on the wavelength of the affected radiation. Thus, these three processes can either be quantified for monochromatic radiation or for polychromatic radiation (and the spectral distribution of the incident radiation may be specified). In addition, reflectance, transmittance and absorptance might also depend on polarization and geometric distribution of the incident radiation, which may also be specified.

Light reflection (e.g., reflectance) may be the ratio of reflected radiant power to incident radiant power. For a certain area elements of the reflecting surface, the (differential) incident radiant power may be the surface's irradiance, multiplied with the size of the surface element. Total reflectance may be further subdivided in regular reflectance and diffuse reflectance, which may be given by the ratios of regularly (or specularly) reflected radiant power and diffusely reflected radiant power to incident radiant power.

Light absorption may refer to the transformation of radiant power applied to a material to another type of energy, usually heat, by interaction with the material. Absorption may be wavelength-specific. The absorptance of a medium may be defined by the ratio of absorbed radiant power to incident radiant power.

The light transmission (or transmittance) of a medium may be defined as the ratio of transmitted radiant power to incident radiant power. Total transmittance may be further subdivided in regular transmittance and diffuse transmittance, which may be given by the ratios of regularly (or directly) transmitted radiant power and diffusely transmitted radiant power to incident radiant power.

Reflection is the process by which electromagnetic radiation is returned either at the boundary between two media (surface reflection) or at the interior of a medium (volume reflection), whereas transmission is the passage of electromagnetic radiation through a medium. Both processes can be accompanied by diffusion (also called scattering), which is the process of deflecting a unidirectional beam into many directions. When no diffusion occurs, reflection or transmission of a unidirectional beam results in a unidirectional beam according to the laws of geometrical optics. Reflection, transmission and scattering leave the frequency of the radiation unchanged, although the Doppler effect may cause a change in frequency when the reflecting material or surface is in motion. Reflectance, transmittance and absorptance are dimensionless. Quantities such as reflectance and transmittance are used to describe the optical properties of materials. The quantities can apply to either complex radiation or to monochromatic radiation.

For example, described herein are methods of making a dental restoration for a patient, so that the dental restoration has optical properties that match optical properties of the patient's teeth. The method may include: receiving a visible light volumetric model of at least the portion of the patient's tooth, wherein the volumetric model includes a representation of an outer surface of the patient's tooth and a region of enamel extending from the outer surface of the patient's tooth to the dentine; further wherein the visible light volumetric model includes an indicator of two or more of: light absorbance, light reflection and light scattering of one or more wavelengths of light for the outer surface of the patient's tooth, the surface of the dentine and the region of enamel; and making a dental restoration from the visible light volumetric model, wherein surface and internal structure of the dental restoration have optical properties based on the visible light volumetric model.

Making the dental restoration may comprise generating a volumetric model of the dental restoration comprising a plurality of voxels, wherein the voxels of the volumetric model of the restoration have values based on the values of voxels of the visible light volumetric model. The shape of the dental restoration may be predefined or selected, and the optical properties may be provided by the visible light volumetric model of one or more of the patient's teeth.

In general, the dental restoration may be manufactured so that its internal structure and surface have the same optical characteristics as the patient's actual teeth, based on the unrestored tooth and/or on one or more neighboring teeth, so that the dental restoration will appear similar to the patient's natural teeth. When manufacturing the actual dental restoration, the dental restoration may be formed manually (e.g., by a technician) guided by the techniques described herein, or semi-manually, or automatically (including by 3D printing techniques). In general, manufacturing the dental restoration may give each voxel of the restoration a similar optical values compared to the reference tooth voxels (e.g., from the visible light volumetric model), for a corresponding position and/or depth within the volume of the tooth.

The dental restoration may be made from the visible light volumetric model either manually (e.g., by selecting materials having the optical properties corresponding to those from the surface and internal structures within a portion of the visible light volumetric model), or automatically, including forming a digital model of the dental restoration with optical properties derived from the visible light volumetric model.

In general, the step of receiving the visible light volumetric model may include receiving the visible light volumetric model from a memory, from a transmission and/or from within the same system, such as by generating the visible light volumetric model. The received visible light volumetric model may be a visible light volumetric model of at least a portion of the patient's tooth for a tooth that is adjacent to the patient's tooth to be restored by the dental restoration. Alternatively, the received visible light model may be the visible light volumetric model for the tooth that is to be restored by the dental restoration and/or for a tooth corresponding to that tooth on the bilateral side of the jaw from the tooth to be restored.

For example, receiving the visible light volumetric model may include generating the visible light volumetric model. Thus receiving the visible light volumetric model may include: generating or receiving a volumetric model of at least the portion of the patient's tooth from a three-dimensional (3D) oral scanner operating in both a near-IR wavelength and a visible light wavelength, wherein the volumetric model includes the representation of the outer surface of the patient's tooth and the region of enamel extending from the outer surface of the patient's tooth to the patient's dentine; estimating values for one or more of: light absorption, light reflection, light transmission, and light scattering of one or more visible light wavelengths for a plurality of voxels defining the outer surface of the patient's tooth and the region of enamel extending from the outer surface of the patient's tooth to the patient's dentine; and adding the estimated values to the volumetric model to form the visible light volumetric model.

Estimating values may comprise estimating values for two or more of: light absorption, light reflection, light transmission, and light scattering for each of the plurality of voxels defining the outer surface of the patient's tooth and the region of enamel extending from the outer surface of the patient's tooth to the patient's dentine. Estimating values may comprise estimating values for one or more of: light absorption, light reflection, light transmission, and light scattering at three or more visible light wavelengths for each of the plurality of voxels defining the outer surface of the patient's tooth and the region of enamel extending from the outer surface of the patient's tooth to the patient's dentine. The three or more visible light wavelengths include one or more red, green and blue wavelength.

In some variations, estimating comprises estimating the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value.

Any of these methods may also include setting the values for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine to a predetermined prior value determined by parametric estimation.

Estimating may comprise estimating the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by iterating to determine the value that approximates optical properties based on the position of the camera and the reconstructed volume compared to RGB data recorded when scanning the patient's teeth with an intraoral scanner to generate the volumetric model. In some variations, estimating comprises estimating the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value determined from a population of representative patients, wherein the prior value is selected using one or more of: measured RGB data recorded when scanning the patient's teeth with an intraoral scanner to generate the volumetric model, volume information, and patient information. The volume information may comprise path length from the surface of the tooth to the dentin through the enamel. The patient information may comprise one or more of: patient age, gender, estimated jaw shape.

In any of these variations, the method may further include dividing the volumetric model into a plurality of sub-regions before estimating the value for one or more of: light absorption, light reflection, light transmission, and light scattering of one or more visible light wavelengths for the outer surface of the patient's tooth and the region of enamel extending from the outer surface of the patient's tooth to the patient's dentine.

Described herein are systems, methods and computer readable media that may virtually render a tooth including visible optical structures that may be used to generate a dental restoration. For example, these systems may include non-transitory computer readable media storing instructions for execution by a processor for preparing a dental restoration having optical properties matching optical properties of a patient's tooth. Any of these systems, methods and computer readable media may: generate or receive a volumetric model of at least a portion of a patient's tooth from a three-dimensional (3D) oral scanner operating in both a near-IR wavelength and a visible light wavelength, wherein the volumetric model includes a representation of an outer surface of the patient's tooth and a region of enamel extending from the outer surface of the patient's tooth to the patient's dentine; estimate values for one or more (e.g., two or more, three or more, etc.) optical properties such as: light absorption, light reflection, light transmission, and light scattering of one or more visible light wavelengths for a plurality of voxels defining the outer surface of the patient's tooth and the region of enamel extending from the outer surface of the patient's tooth to the patient's dentine; add the estimated values to the volumetric model to form a visible light volumetric model; and make a dental restoration from the visible light volumetric model.

The volumetric model of at least the portion of the patient's tooth may be received, e.g., by a processor, and the volumetric model may comprise a plurality of voxels defining the outer surface of the patient's tooth and the region of enamel extending from the outer surface of the patient's tooth to the patient's dentine. The volumetric model may be received by a separate apparatus, such as a dental scanner, including a dental scanner (e.g., intraoral scanner) that is capable of forming a 3D volumetric model, as described more fully in U.S. patent application Ser. No. 15/662,234, titled "INTRAORAL SCANNER WITH DENTAL DIAGNOSTICS CAPABILITIES," filed on Jul. 27, 2017, herein incorporated by reference in its entirety. In some variations the processor is part of, or coupled to, the scanner. Alternatively or additionally, the volumetric model may be stored in a memory that is accessed by the processor.

For example, a (3D) oral scanner may concurrently or simultaneously scan a patient's tooth or teeth in both a near-IR wavelength and a visible light wavelength. The scan may generate the volumetric model so that the initial volumetric model includes a representation of an outer surface of the patient's tooth and a region of enamel extending from the outer surface of the patient's tooth to the patient's dentine. The depth of penetration may depend upon the scan. Near-IR light may penetrate into the enamel to at least the dentine, so that the volumetric model may be reconstructed from the near-IR scanning to provide highly accurate three-dimensional models of the scanned region, including the thickness, shape and distribution of the enamel and/or dentine. The visible light scan may be coordinated with the penetrative near-IR scan, and may include one or more (e.g., RGB) wavelengths.

The values for one or more of: light absorption, light reflection, light transmission, and light scattering may be estimated from the volumetric model. In some variations, it may be beneficial to estimate the values for two or more of light absorption, light reflection, light transmission, and light scattering (e.g., estimated values for: light absorption and light reflection; light absorption and light transmission; light absorption and light scattering; light reflection and light transmission; light reflection and light scattering; and/or light transmission and light scattering). In some variations, three or more of light absorption, light reflection, light transmission, and light scattering may be estimated (e.g., light absorption, light reflection and light transmission; light absorption, light reflection, and light scattering and light scattering; light absorption, light transmission, and light scattering; and/or light reflection, light transmission, and light scattering). In some variations all four of light absorption, light reflection, light transmission, and light scattering may be estimated.

Estimations of light absorption, light reflection, light transmission, and light scattering may be made based on the dentin positions within the tooth, which may be extracted from the volumetric model. Some or all of the optical properties of light absorption, light reflection, light transmission, and light scattering may be estimated for multiple visible light wavelengths for voxels defining at least a portion of the volumetric model, such as the voxels defining the outer surface of the patient's tooth and the region of enamel extending from the outer surface of the patient's tooth to the patient's dentine. For example, visible light wavelengths for a one or more of red, green and blue wavelengths, and in some variations each of red, green, and blue, may be provided.

Estimations for one or more of: light absorption, light reflection, light transmission, and light scattering for voxels (and/or regions of voxels) defining the outer surface of the patient's tooth and the region of enamel extending from the outer surface of the patient's tooth to the patient's dentine may be provided by setting values. For example, estimating the values may include setting the values for the outer surface of the teeth and the volume of the enamel between the teeth and the dentin to predetermined values (e.g., prior values) that may be selected based on the visible light wavelength(s) provided in the original volumetric data. In some variations, the processor may refer to a database or memory that includes values for the one or more optical properties (e.g., light absorption, light reflection, light transmission, and light scattering). The values of the optical properties may be determined from average values, population values, or the like. When setting the voxel values for the one or more optical properties, values may be assigned based on a correlation to similar surface values. For example, the outer surface may be assigned or set values by assuming basic vales (e.g., prior characteristics) for the outer surface and/or enamel and/or dentine surface. The 3D volumetric model may include a model of the outer surface of the teeth or tooth, and the one or more optical parameter values may be set for corresponding voxels based on how well the assumed parameters (modeled parameters) fit to the measured values that may be included in the volumetric model.

For example, an estimate of the one or more optical properties may be made based on assumed parameters that are set, and these assumed parameters may be tested against the estimates parametric estimation or a similar method may be used to estimate parameters from the volumetric model in order to generate estimated images that may be compared to actual images taken by the scan to determine the 3D volumetric model or derived from the 3D volumetric model. For example, assuming parameters of the enamel, these assumed parameters may be used to generate an expected image of the teeth that may be compared to actual data from the patient that is included in the original volumetric model; by comparing how well the actual, measured data fits to the expected values model, the assumed values for the one or more optical properties may be changed to improve the fit between the measured data and the estimated image(s) using a technique such as parametric estimation, for example.

Thus, one or more optical properties (e.g., light absorption, light reflection, light transmission, and light scattering) of one or more visible light wavelengths for each of the plurality of voxels defining the outer surface of the patient's tooth and the region of enamel extending from the outer surface of the patient's tooth to the patient's dentine may be estimated by setting the value to a predetermined prior value. The resulting estimation may be refined by comparing images of the modeled teeth generated using these values to images from the volumetric model. Thus, the values for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine may be set to a predetermined prior value determined by parametric estimation. For example, the values that approximate optical properties may be determined by iterating based on the position of the camera and the reconstructed volume compared to RGB data recorded when scanning the patient's teeth with an intraoral scanner to generate the volumetric model.

In some variations, values for the one or more optical properties may be set within a visible light volumetric model by setting the value to a predetermined prior value determined from a population of representative patients, wherein the prior value is selected using one or more of: measured RGB data recorded when scanning the patient's teeth with an intraoral scanner to generate the volumetric model, volume information, and patient information. Alternatively or additionally, setting the value to a predetermined prior value may be determined from a population of representative patients, wherein the prior value is selected using one or more of: measured RGB data recorded when scanning the patient's teeth with an intraoral scanner to generate the volumetric model, volume information, and patient information. For example, the volume information may comprise path length from the surface of the tooth to the dentin through the enamel. The patient information may comprise one or more of: patient age, gender, estimated jaw shape.

Thus, estimating values for the one or more optical properties as described herein may include setting the voxel (or regions of voxels) in the regions between the surface of the tooth and the dentine to one or more prior values. For example, the prior values may be based on an average light absorbance and light scattering per wavelength (color); the images (e.g., visible light images) taken when scanning to form the initial volumetric 3D model may be used to estimate the optical properties for the surface and enamel. Specifically, the surface and enamel optical property values may be estimated from the prior values using an iterative method that solves for optical properties (e.g., absorption, reflection, and transmission) based on the position of the camera and the reconstructed volume compared to the actual RGB images taken with the scanner.

In any of the methods, systems and/or computer-readable media described herein, the volumetric model may be divided into a plurality of sub-regions before estimating the value for the one or more optical properties (e.g., light absorption, light reflection, light transmission, and light scattering) of one or more visible light wavelengths. These sub-regions may include any number of voxels (e.g., one or more) and may be grouped based on the shape or morphology of the tooth. For example, regions of the enamel (e.g., isothermal regions and/or region a fixed range or distance from the surface) may for sub-regions.

The method, systems and/or computer-readable media described herein may form a model, e.g., a visible light volumetric model, that includes the values for the one or more of optical properties (e.g., light absorption, light reflection, light transmission, and light scattering) of one or more visible light wavelengths for the outer surface of the patient's tooth and the region of enamel extending from the outer surface of the patient's tooth to the patient's dentine. The visible light volumetric model may also include the original volumetric model. A dental restoration may be formed from the visible light volumetric model.

For example, described herein are non-transitory computer readable medium storing instructions for execution by a processor that, when executed, cause the processor to: generate or receive a volumetric model of at least a portion of a patient's tooth, wherein the volumetric model includes a representation of an outer surface of the patient's tooth and a region of enamel extending from the outer surface of the patient's tooth to the patient's dentine; estimate values for one or more of: light absorption, light reflection, light transmission, and light scattering of one or more visible light wavelengths for the outer surface of the patient's tooth and the region of enamel extending from the outer surface of the patient's tooth to the patient's dentine; and add the estimated values to the volumetric model to form a visible light volumetric model.

In some variations, estimating the values for one or more of the optical properties may include setting the outer surface and the region of enamel between the outer surface and the dentine to predetermined (prior) values and use the measured RGB image date for the corresponding volume region to solve for optical properties of the surface, using the volume information, e.g., path length from the surface of the tooth to the surface of the dentin through the enamel. The predetermined/prior values may be selected based on patient information (e.g., age of patient, estimated from jaw shape, etc.), a set list of predetermined/prior values based on available restoration materials, etc.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings.

DETAILED DESCRIPTION

Figure 1:
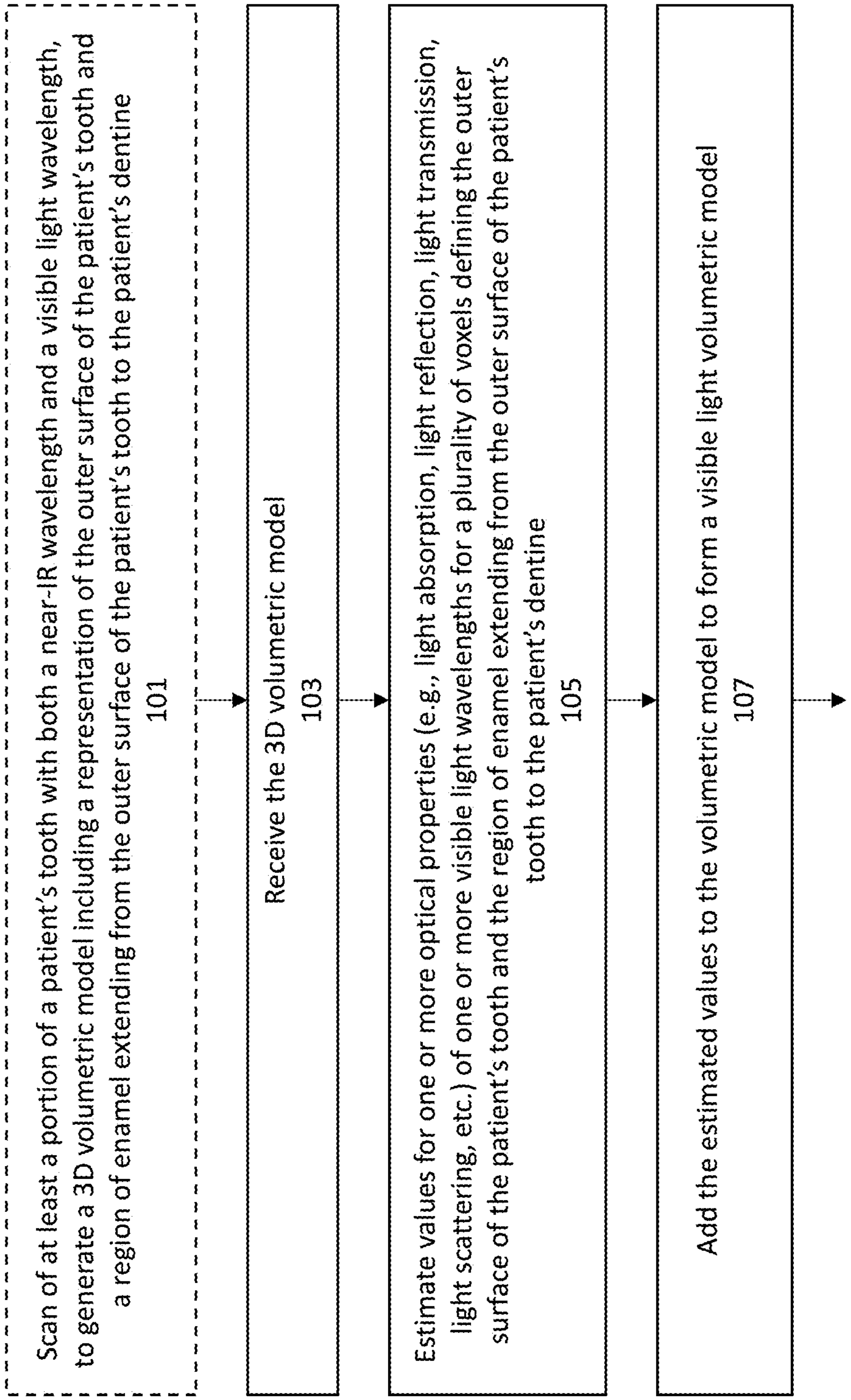
FIG. 1 is an example of one method of the creation of a visible light volumetric model that may be used to fabricate a dental restoration.

Described herein are apparatuses (system and devices), automated methods and/or computer-readable media for aiding in the creation of dental restorations, such as dental implants, that closely resemble a patient's natural teeth, including in particular its internal optical structure. In general, the systems, methods and/or computer-readable media may virtually render a model of a patient's tooth or teeth, including the internal optical structure. The patient's tooth may be the tooth to be repaired by the dental restoration, an adjacent tooth, a corresponding bilateral tooth, or any other of the patient's natural teeth. This model, which may be referred to as a visible light volumetric model, may then be used manually or automatically to create a highly accurate dental restoration, such as an artificial tooth, cap, denture, veneer, bridge, etc., having the same or similar optical properties compared to the patient's natural teeth.

Most dental restorative implants apply only surface properties. Such estimates fail to accurately approximate the visual properties of a tooth, which may vary based on the lighting of the tooth, resulting in poor matching between a restorative implant and the patient's natural teeth, particularly in differently lit environments. Teeth have specific optical properties including color and transparency, which may be a function of both external and internal features. When creating dental restorations, it is highly desirable to make the tooth restoration so that it has a realistic, and preferably customized, color and transparency that matches or is consistent with the patient's existing teeth. A visible light volumetric model may provide a model of a tooth or teeth that can guide the formation of the dental restoration.

As described herein, a visible light volumetric model may include both a structural mapping of a volume of a patient's tooth or teeth that may form all or part of a dental restoration and may also include a one or more optical properties associate with regions within the volume of the structural mapping. Although a variety of optical properties may be associated, it may be particularly helpful to include one or more of: light absorption, light reflection, light transmission, and light scattering. Additional or alternative optical properties that may be used include: hue, transparency, translucency, opalescence, chroma, value, luster and florescence. These optical properties maybe specific to one or more light wavelengths (e.g., visible light wavelengths, such as red, green and/or blue wavelengths or groups of wavelengths).

When producing (either automatically or manually) a dental restoration using the visible light volumetric model, the structural and/or optical properties within the model may be used. The visible light volumetric model is a volumetric model that provides information on both external and internal structures; the addition of the optical properties may then provide a guide or map for forming a restoration. The optical properties may be used to select the materials used to form the dental restoration. In some variations the optical properties may be used to select the material(s) forming the dental restoration. For example, the optical properties may be matched to optical properties for materials used to form the dental restoration (e.g., plastics, ceramics, dyes/colorants, etc.). In some variations the systems, methods and/or computer-readable media may automatically convert the optical properties provided in a visible light volumetric model into one or more materials that may be used. Alternatively or additionally, the values of the optical properties within the visible light volumetric model may be converted or adjusted into values that may be used to select the material(s) used to form the dental restoration, or may simply be replaced with an indicator (e.g., name, number, etc.) for the material(s) having the same or similar optical properties.

The visible light volumetric model may be a collection of voxels describing the volume of the patient's tooth or teeth. In some variations, this volume is determined directly from the patient's existing teeth by scanning, e.g., using an intraoral scanner, as described below in Example 1. In other variations, the volume is a reconstructed volume that is based on another region of the patient's teeth or tooth. For example, when making a dental restoration of a patient's tooth, it may not be possible to scan the missing tooth. However, a 3D volumetric scan of other patient teeth, such as the symmetric tooth and/or an adjacent tooth, may be used as a template for the visible light volumetric model of a dental restoration. Alternatively the visible light volumetric model may be a model of the patient's existing teeth and the fabricator (manual or automatic) may use the visible light volumetric model as a guide for forming a missing tooth, and matching the internal structural (e.g., enamel and/or dentin) and optical properties.

The systems, methods and/or computer-readable media described herein may provide more accurate information that may be used to form a restorative implant. The visible light volumetric models described herein may also find use that is not limited to the formation of dental restorations. For example, the visible light volumetric model may be used to track patient dental health, plan or track dental treatments, provide guidance to a dental practitioner in treating the patient (e.g., in making fillings, oral surgery, etc.) and/or for cosmetic procedures such as tooth whitening.

FIG. 1 is a general overview of an exemplary method (which may be performed by a system as described herein) for the creation of a visible light volumetric model that may be used to fabricate a dental restoration. Optionally, a scan of at least a portion of a patient's tooth with both a near-IR wavelength and a visible light wavelength may be used to generate a 3D volumetric model including a representation of the outer surface of the patient's tooth, and a region of enamel extending from the outer surface of the patient's tooth to the patient's dentine 101. The scan information, including the images taken while scanning for either or both the visible light wavelength(s) and the near-IR wavelength(s) may be included with or as part of the 3D volumetric scan. The scan may be performed by an intraoral scanner that is part of the overall system, or separate. The 3D volumetric model may then be received by a processor 103 (e.g., of a dental restoration fabrication system, as described below in reference, and used to estimate value for one or more optical properties (e.g., light absorption, light reflection, light transmission, light scattering, etc.) of one or more visible light wavelengths for a plurality of voxels defining the outer surface of the patient's tooth and the region of enamel extending from the outer surface of the patient's tooth to the patient's dentine 105. The estimated values for the optical properties may then be added to the 3D volumetric model to form the visible light volumetric model. In general, the visible light volumetric model includes a plurality of voxels that describe the 3D volume of a patient's tooth or teeth and at least some of these voxels (e.g., the region between the outer surface and the enamel between the outer surface and the dentine) include information about the optical properties of one or more visible light wavelengths.

Figure 2:
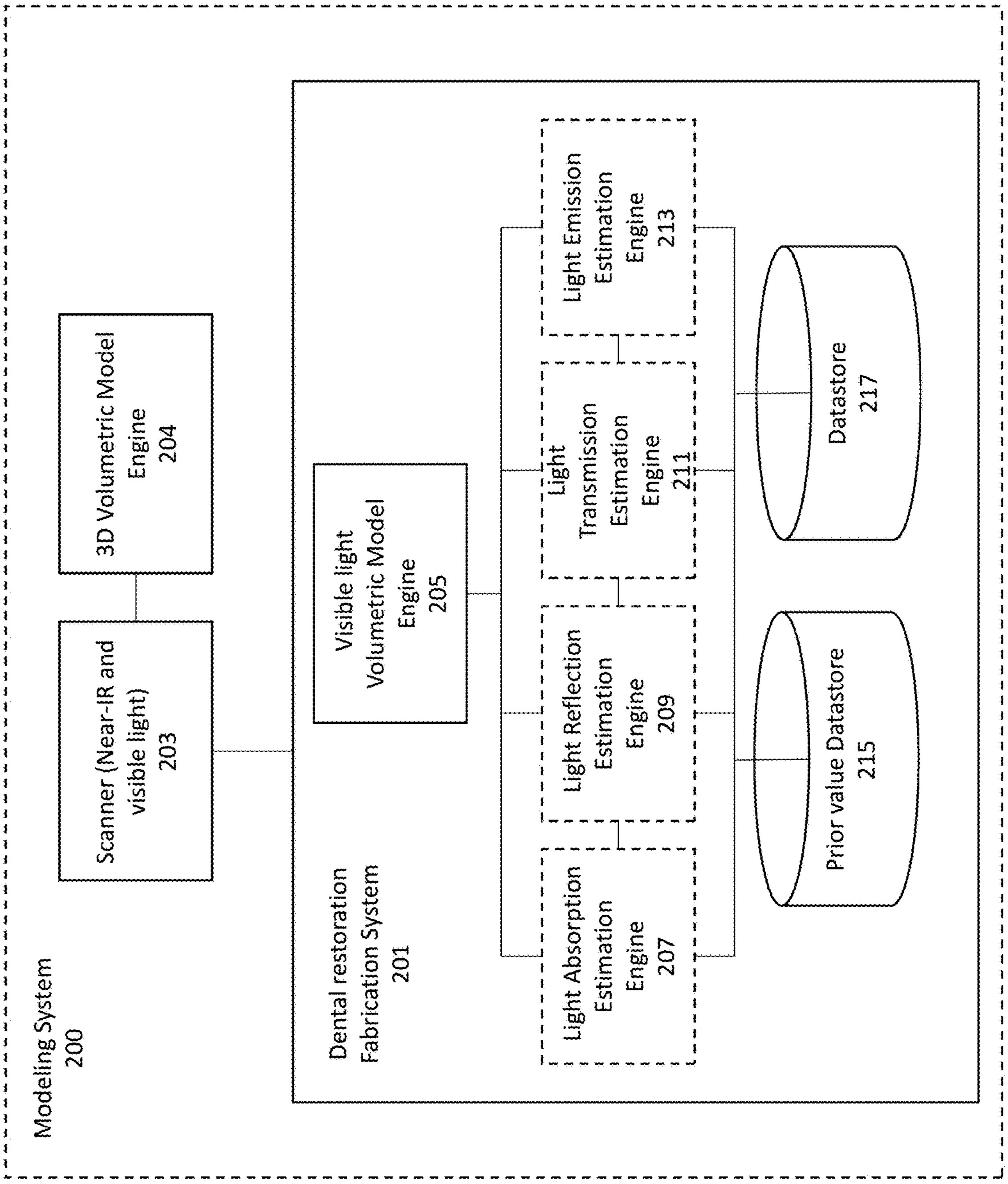
FIG. 2 is an example of a system that may generate a visible light volumetric model which may be used to fabricate a dental restoration. Thus, a portion of this system may be referred to as a dental reconstruction fabrication system.

FIG. 2 is a diagram showing an example of a dental restoration fabrication system 201, which is optionally shown as part of a larger modeling system 200. The modules of the dental restoration fabrication system 201 may include one or more engines and data stores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, data stores are intended to include repositories having any applicable organization of data, including tables, comma-separated values (CSV) files, traditional databases (e.g., SQL), or other applicable known or convenient organizational formats. Data stores can be implemented, for example, as software embodied in a physical computer-readable medium on a specific-purpose machine, in firmware, in hardware, in a combination thereof, or in an applicable known or convenient device or system. Data store-associated components, such as database interfaces, can be considered part of a data store, part of some other system component, or a combination thereof, though the physical location and other characteristics of data store-associated components is not critical for an understanding of the techniques described herein.

Data stores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The data stores, described herein, can be cloud-based data stores. A cloud-based data store is a data store that is compatible with cloud-based computing systems and engines.

The dental restoration fabrication system 201 may include a computer-readable medium, a visible light volumetric model engine 205, one or more optical property estimation engines (e.g., light absorption estimation engine 207, light reflection estimation engine 209, light emission estimation engine 213, light transmission estimation engine 211, etc.), and a prior value data store 215. Additional data stores 217 may be included, e.g., referencing patient information and/or materials information. One or more of the modules of the dental restoration fabrication system may be coupled to one another (e.g., through the example couplings shown in FIG. 2) or to modules not explicitly shown in FIG. 2. The computer-readable medium may include any computer-readable medium, including without limitation a bus, a wired network, a wireless network, or some combination thereof.

The optical property estimation engines may implement one or more automated agents configured to learn matching of the optical properties based information from 3D virtual representations of teeth taken from subjects (e.g., other 3D volumetric models).

Estimation of One or More Optical Properties

In a first example, a restorative implant having more realistic optical properties may be made from a visible light volumetric model in which one or more optical properties is estimated for outer surface and the region(s) between the outer surface and the dentin of the volumetric model by using the structural information in the volumetric model, including the dentin position within the tooth or portion of a tooth of the volumetric model. Volumetric data may be used to indicate where in the tooth the dentin is positioned relative to the outer surface, providing an estimate of the thickness of the enamel. The optical properties (e.g., light absorption, light reflection, light transmission, and light scattering of one or more visible light wavelengths) of the tooth or tooth portion within the volumetric model may be determined for each of a plurality of voxels within the volumetric model by using the morphology of the tooth or tooth region, including the thickness of the enamel and the location of the dentin within the enamel, and using optical information taken or extracted from the visible light wavelength(s) taken by the scan that are include as part of the volumetric model.

For example, in some variations, the optical properties of the outer surface and the region between the outer surface and the dentin (and in some variations, including the dentin), the average light absorbance and light scattering and/or scatter per wavelength (e.g., color), may be estimated from the visible light image(s) in the volumetric model that is passed on to the processor operating to estimate the optical properties (e.g., the visible light volumetric model engine). For example, when the visible light images taken by the intraoral scanner used to generate the volumetric model are RGB images, these images may be used to estimate the optical properties for the surface and enamel. In some variations, the optical properties may be determined by assuming a starting prior value for the different region(s) of the tooth, including the outer surface, enamel and in some cases, the dentine. For example, the different depths of enamel may be provided with different starting prior values of the one or more optical properties, or the enamel may be treated as initially homogeneous and initially set with the same prior value of these one or more optical properties. This intermediate rendering model with these starting optical property values may then be compared against the actual volumetric model, and in particular, the visible light image(s) of the volumetric model (or used to form the volumetric model). The volumetric model may include the camera position (or may assume a camera position) when scanning. This allows the system to generate estimated images from the intermediate rendering model ("estimated images") that may be directly compared with the images taken by the scanner ("real images"). The comparison between the real images and the estimated images may be quantified and the difference between the real images and the estimated images may be minimized by iteratively adjusting the starting optical property values until the estimated images converge to a value within an acceptable range within the real images. The acceptable range may be predetermined, or it may be determined based on the rate of change of the difference. Any appropriate iterative minimization protocol may be used. Any appropriate iterative minimization protocol may be used. For example, nonlinear minimization techniques may be used.

In this first example, the methods, systems and/or computer-readable media described herein may assume that the prior values are constant. Prior values may be used for the optical properties not just of the outer surface, but also for the enamel thickness between the outer surface and the dentine. The methods, systems and/or computer-readable media described herein benefit from the use of an intraoral scanner that is able to determine both tooth shape (external features, including external enamel) as well as the thickness of the enamel and the position and distribution of dentin within the tooth.

The initial parameters may be adjusted preferentially over certain regions, including within the outer surface and/or the enamel or regions of enamel. In some variations optical properties (e.g., one or more or two or more of light absorption, light reflection, light transmission, and light scattering) may be set based on a guess from the visible light portion of the initial volumetric model. In some variations the system, and particularly a parameter value setting engine portion of the system, may be configured as an agent that is capable of machine learning to set the initial values of the optical property based on the volumetric models from multiple patients.

Once the iterative minimization has sufficiently converged on values for the one or more (e.g., two or more) optical properties for the voxels making up the outer tooth surface and the region between the outer tooth surface and the dentine, these optical properties may be added to all or a portion of the original volumetric model to form the visible light volumetric model.

In use, a dental restoration may be generated using the visible light volumetric model. The visible light volumetric model may provide a more realistic model of the optical appearance of the patient's tooth or teeth. This more realistic visible light volumetric model may then be applied automatically or manually to form the dental implant. The model may be used to replace or reconstruct a tooth. In some examples the original volumetric model may be formed by scanning the tooth to be replaced or reconstructed in order to determine the location (and shape) of the dentin within the tooth relative to the surface (e.g., the thickness of the enamel), so that the method described above may be used to form a more accurate visible light volumetric model of the tooth including the dentin location within the tooth. If the target tooth being remodeled and/or replaced is missing from the patient's oral cavity, one or more teeth adjacent to the target tooth may be scanned, or more preferably, the complimentary tooth on the opposite side of the jaw, may be scanned, if present (e.g., if replacing the upper right canine, the upper left canine may be scanned). The reconstructed tooth is therefore assumed to have similar optical properties to the remaining teeth.

A dental restoration may be formed from the visible light volumetric model including the one or more optical properties within some or all of the voxels describing the outer and inner structure of the teeth. For example, the optical properties of a material representing the dentin and/or enamel may be applied manually or automatically on or in the dental restoration as it is formed, to mimic the more natural-looking optical properties. The tooth may be fabricated manually or more preferably automatically, etc., using a 3D printer or other additive fabrication technique.

In addition to the information about the shape and extent of the dentin and the thickness of the enamel, a model of a target tooth may incorporate a more realistic representation of the optical properties of the patient's dentin and enamel. For example, a target tooth, or region of a target tooth, may be modeled (and/or fabricated) using a volumetric model of the target tooth, or a similar tooth, describing the relative dentin position within the tooth, along with prior information about the optical properties of the dentin and enamel. The prior information of the dentin and enamel may include values for dentin average color (and in some variations scatter and absorption), and values for enamel absorption and scatter. These value may be per wavelength. Prior values may be assumed values, and may be based on averages or populations.

Using the prior values as well as the volumetric information about the tooth, the systems and methods described herein may determine an estimate of the optical properties of the tooth as the tooth may appear for any point and angle (actual image data).

The optical properties of a tooth when observed from a position outside of the tooth may depend in part on the volumetric properties of the tooth. For example, the light scatter and the absorption of light at different illuminating wavelengths may change as the light passes through the different layers (e.g., enamel and dentin), as well as the surface properties of the tooth. Thus, the appearance of the tooth is built on the different layers. A volumetric model of the tooth taken using a penetrating wavelength, e.g., near-IR, may provide a three-dimensional volumetric dataset for the tooth and this model may be used to estimate the effect of these different layers on the optical properties of the tooth. For example, the color, Y, of the tooth from a particular position (e.g., from outside of the tooth at a given point and angle relative to the tooth) may be estimated, for a particular wavelength, as the difference between the enamel contribution and the product of the Dentin contribution and the length to the dentin from the point (e.g., from the outer surface).

As described above, the estimate of optical properties per wavelength may be compared to the actual optical properties seen or measured from outside the tooth. For example, a scanner (e.g., in some variations, the same scanner determining the volumetric model of the teeth) may record RGB information for the tooth from outside of the tooth, and this measured value for a particular point and angle, X, may be compared to the calculated valve, Y. The difference between X and Y per wavelength may provide a value (e.g., a "re-interpreted X value" or error) that may be minimized when forming a model of the tooth. For example, the prior values of the dentin average optical properties (e.g., scatter and absorption), and the prior values for enamel optical properties (e.g., absorption and scatter) may be modified to minimize the re-interpreted X value, over a range of (visible) wavelengths.

In practice, the materials used to form the enamel and dentin in the model may be limited to finite number of materials having optical properties, e.g., average light scattering (light reflection) and light absorption. In order to determine which of the materials to use for modeling the enamel and dentin, the optical properties of the available materials may be used as the prior values used to calculate optical properties, Y, at different wavelengths, and the materials resulting in the best fit to the observed color (e.g., the minimum reinterpreted X value) may be used to model the tooth or tooth portion. Thus, by setting the prior values to the values taken from the available materials, the materials providing the best fit may be determined.

Alternatively, the prior values for the optical properties of the enamel and/or dentin may be estimated from one or more patient or tooth-specific properties. For example, the prior values may be estimated for the enamel and/or dentin based on one or more properties such as the age of the patient, which may be known, or from an estimate of the patient age based on jaw shape, tooth structure, or other internal structure, or a measured property from the teeth, such as the near-IR transparency, absorption or scattering of the teeth. These additional properties may be used to refine the estimates of the enamel and/or dentin so that they may be calibrated specifically to the patient. For example a system may be trained to calibrate between known parameters and the optical properties of the dentin and/or enamel (e.g., the prior values that may be used).

Alternatively, rather than use prior values for the optical properties of the tooth in order to model the tooth (or a region of the tooth) to generate the visible light volumetric model, a tooth may be scanned both to determine the geometric distribution of the dentin and enamel within the volume of the tooth (e.g., using a near-IR wavelength or range of wavelengths) as well as using one or more visible light wavelengths that are partially absorbed and scattered by the enamel. Estimates of the volumetric transparency and scattering and/or absorption of the teeth at particular visible light wavelengths may be derived from these additional (e.g., RGB) visible light wavelength scans, in conjunction with the near-IR wavelength scan information, and may provide an accurate approximation of the internal structures. Although these additional (e.g., RGB) wavelengths are less penetrative, since the enamel is much less transparent to them, it may be difficult to solve for a volumetric distribution of internal structures (e.g., dentin) within the tooth using just this information. However, if this information is combined with volumetric information from the more penetrating near-IR information, providing accurate locations of the internal structures, the transparency and absorption at each of the visible light wavelengths may be approximated by modifying the same procedures that could otherwise be used to find internal structures.

For example, volumetric information may be determined from a tooth by scanning from a plurality of different positions around the tooth using a near-IR wavelength. The scanning provides both the location of the scanner (e.g., the location of the emitted/received near-IR light) and an image taken through the tooth at that position. This data may be used to reconstruct the internal volume, assuming that the transparency of the enamel to the near-IR light is high, while the transparency of other internal structures (e.g., dentin, carries, etc.) is lower. When visible light, for which the enamel is not highly transparent, but instead may be absorptive and/or scattering, is used to scan the tooth, the parameters of transparence and/or absorption/scattering may be set as a variable, with the internal structure being known from the near-IR imaging. Thus, in some variations, the visible light volumetric model may be more directly determined from the initial volumetric model to include the optical properties, such as transparency and/or absorption/scattering that may be generated at a plurality of visible light wavelengths.

For example, a technique which may be referred to as volumetric back propagation may be used. Volumetric back propagation may be used to estimate (e.g., trace) rays of a sensing wavelength going through the tooth volume and entering the camera. The actual intensities reaching the sensor for each ray may be determined from the penetrative images and sensor (camera) positions and orientations. For each ray, the damping of the intensity due to scattering in the volume it passes may be estimated. For example, when using near-IR light, the transmission of light through a strongly scattering and weakly absorbing material may be modeled using a hybrid calculation scheme of scattering by a technique (e.g., such as the Monte Carlo method) to obtain the spatial variation of transmittance of the light through the material. A set of projection data may be estimated by spatially extrapolating the difference in the optical density between the absorbing object and a non-absorbing reference to the shortest time of flight. This technique may therefore give a difference in absorption coefficients. For example, sec E. Wolf, "Three-dimensional structure determination of semi-transparent objects from holographic data," *Optics Communications,* 1(4), pp. 153-156 (1969). The volumetric scattering may then be estimated by solving for the actual intensities reaching the sensor.

Given the volumetric structural model from the near-IR data, another wavelength (e.g., from visible spectrum) may be used to solve for one or more optical properties such as transparency. For example, this may be done either directly using the volumetric model from the near IR, or modifying the volumetric model using a pre-determined method (e.g., specifying some pre-measured function/map from near IR transparency to R/G/B transparency).

In any of these methods, when solving for the optical properties (such as light transparency and/or light absorption/scattering) of the visible light at different frequencies within the tooth volume, assumptions may be made to simplify the procedure. For example, the method may assume that the enamel on the teeth has uniform optical properties (e.g., transparency, absorption, scattering, etc.). Thus, any estimate of the optical properties may be uniformly applied to the modeled tooth or tooth region. Alternatively, the method may assume that individual teeth (or groups of teeth) have similar or identical optical properties. Thus, when modeling more than one tooth or groups of teeth, the method may separately model these different groups of teeth to determine optical properties for the different teeth or groups of teeth in the model. Finally, the method may presume that the optical properties of each point or sub-volume (e.g., voxel) within the enamel at some resolution may have different values; the method may therefore calculate a map or model of these optical properties that may correspond to the volumetric model (e.g., the model generated from the near-IR imaging).

As mentioned above, the volumetric model from the near-IR wavelengths, as well as the optical properties (forming the combined visible light volumetric light model) may be used to construct a model of a tooth or portion of a tooth (or multiple teeth) having similar or identical optical properties as a natural tooth for that patient. This information may be used to generate a more accurate digital model of the tooth (or teeth) and/or a more accurate physical model, such as a restorative implant. The restorative implant may be fabricated, for example, by 3D modeling using materials corresponding to the optical properties and volumetric structures identified.

Although the exemplary methods described above typically use the volumetric information taken from the near-IR scanning and modeling to determine internal structures such as the region between the dentin and the enamel in addition to visible light (e.g., RGB) wavelengths, any of these methods may instead or additionally be used with a visible light wavelength, particularly in the red (e.g., around 650 nm, e.g., between 600-750 nm, between 600-740 nm, between 600-730 nm, between 600-720 nm, between 600-710 nm, between 600-700 nm, etc.). In some variations, both the near-IR wavelength and a visible light wavelength may be used to determine a volumetric model (or models, which may be combined) of the teeth, and the additional optical properties may be used to determine the color and/or transparence of the teeth.

For example, in one example, volumetric data derived from a visible light wavelength (e.g., red) may be used to determine the relative location of dentin in the tooth being replaced or simulated, and the optical properties of the simulated tooth or tooth portion may be estimated for the tooth. The internal structure may be formed in the model (e.g., as part of a restorative implant and/or digital model) and the enamel may be applied having an estimated or matched color.

In another example, the volumetric data derived from a visible light wavelength (e.g., red) may be used to determine the relative location of dentin in the tooth, and prior information about the optical properties of the dentin and enamel may be used (e.g., such as values for dentin average color, scatter and absorption, etc., and values for enamel absorption and scatter). This information may then be used to generate the model, such as a restorative implant, of the tooth, as described above.

Also described herein are methods in which the optical properties (e.g., light absorption, light transmission, light reflection, light emission, etc.) of a tooth or region of a tooth may be determined by directly scanning with wavelengths of light within the visible light spectrum separately, and a volumetric estimation for each wavelength may be generated for each wavelength. This information may provide each color component separately, and the final information may be used to determine the contribution of each color component at the depths within the volume. In this example, a volumetric reconstruction using each different wavelength (e.g., a red, a blue and a green wavelength) may provide an estimate of the contribution of each of these wavelengths to the final optical properties to be modeled. For example, although the penetration of light in the blue wavelength through the teeth will typically be very low, and therefore the depth of penetration of the volumetric information may be equivalently low, this information may be combined with the volumetric model from the other visible wavelengths to provide a model of the visible properties of the teeth.

Volumetric models using each of the visible light wavelengths may be estimated, for example, using volumetric back propagation, or any other appropriate method. The scanner may provide the positon information for the emitting/sensing of the visible light wavelength, relative to the teeth, as well as the plurality of different images taken with each wavelength from known positions. This combination of information may then be used to solve for the volumetric information within the scanned tooth.

A combined model, combining the volumetric reconstructions of each of the visible (e.g., RGB) wavelengths, may be used to form a more accurate digital model, which may in turn be used to generate a physical model, such as a restorative implant. For example, a three-dimensional printer that allows the RGB components of each voxel to be specified may receive this information for each voxel within the reconstructed volume.

EXAMPLE

Figure 3B:
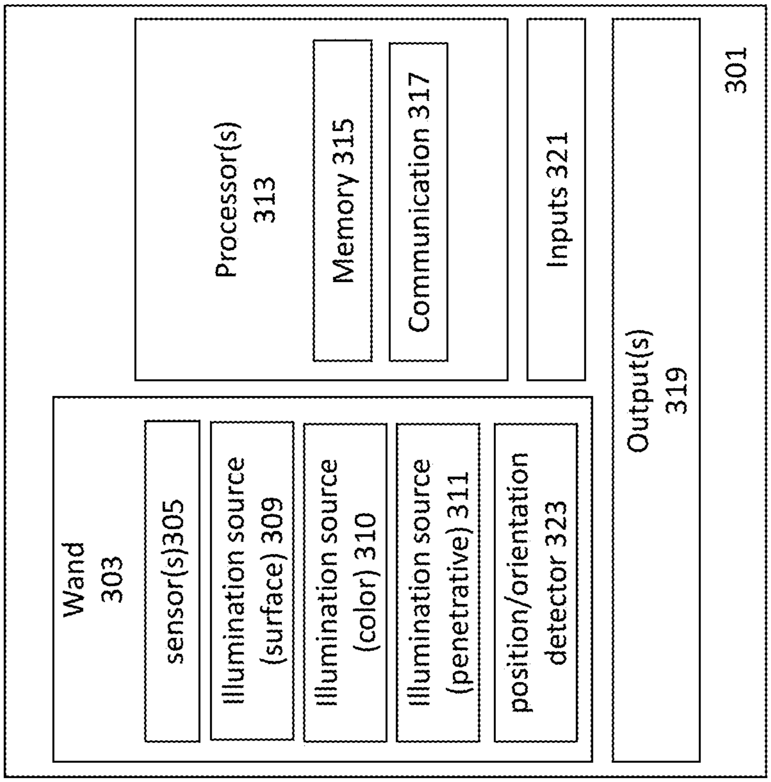
FIG. 3B schematically illustrates an example of an intraoral scanner configured to generate a model of subject's teeth having both surface and internal features.
Figure 3A:
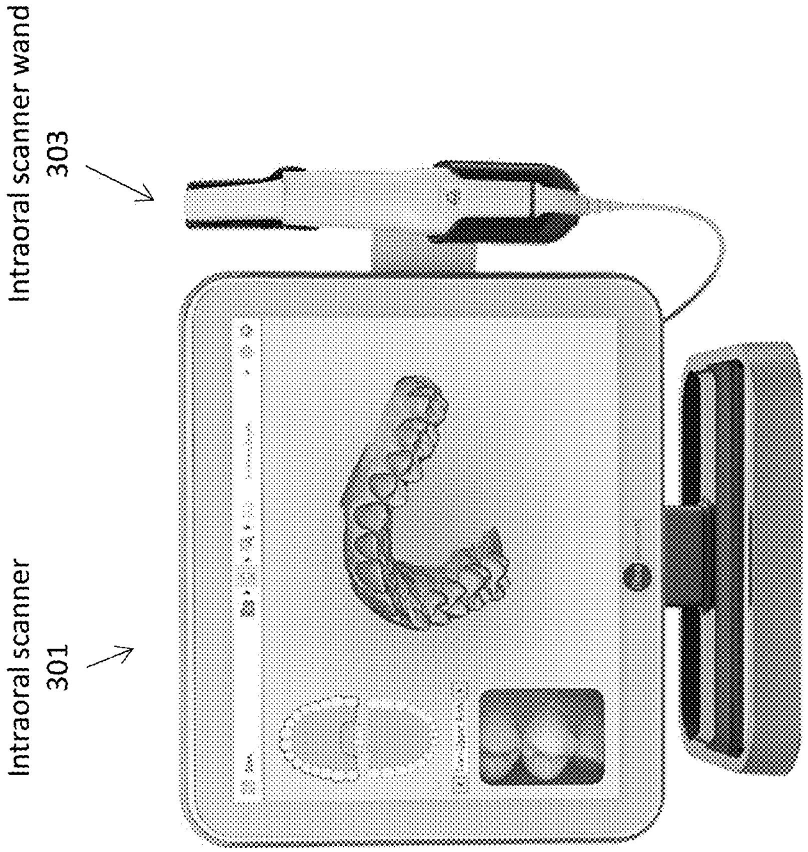
FIG. 3A illustrates one example of a 3D (color) intraoral scanner that may be adapted for used as described herein to generate a volumetric model of subject's teeth having both internal (identified by near-IR) and external (e.g., surface) figures, including a visible light wavelength.

The methods, systems and/or computer readable media described herein may be used with, or may include a scanner such as an intraoral scanner that scans both in near-IR (penetrative) and visible light (e.g., while light, approximately 400-600 nm) illumination. For example, FIGS. 3A and 3B illustrate such an intraoral scanner. The use of visible light in addition to the use of a penetrative wavelength, such as a near-IR illumination (e.g., 850 nm) may allow optical properties to be determined in addition to volumetric properties. A visible light volumetric model may include and correlate both types of information (e.g., internal and external structural information as well as optical properties), which may produce a more accurate map of a tooth or teeth that may be used for more precisely identifying (and later matching) the colors, transparency and shading of the teeth, e.g., in producing a dental restoration. The visible light volumetric model may be used with one or more techniques, such as 3D printing, to restore or produce the whole 3D structure of all or part of an original tooth having matching optical properties, in order to get a better simulation of the tooth for dental restorations (e.g., crowns and implants). The original volumetric model may be generated as described herein, using, for example, near-IR and/or trans-illumination scans that are combined with 3D scan of the teeth surface.

The methods and apparatuses described herein may include intraoral scanners for generating a three-dimensional (3D) model of a subject's intraoral region (e.g., tooth or teeth, gums, jaw, etc.) which may include internal features of the teeth and may also include a model of the surface, and methods of using such scanners. For example, FIG. 3A illustrates one example of an intraoral scanner 301 that may be configured or adapted as described herein to generate 3D models having both surface and internal features. As shown schematically in FIG. 3B, an exemplary intraoral scanner may include a wand 303 that can be hand-held by an operator (e.g., dentist, dental hygienist, technician, etc.) and moved over a subject's tooth or teeth to scan both surface and internal structures. The wand may include one or more sensors 305 (e.g., cameras such as CMOS, CCDs, detectors, etc.) and one or more light sources 309, 310, 311. In FIG. 3B, three light sources are shown: a first light source 309 configured to emit light in a first spectral range for detection of surface features (e.g., visible light, monochromatic visible light, etc.; this light does not have to be visible light), a second color light source (e.g., white light between 400-700 nm, e.g., approximately 400-600 nm), and a third light source 311 configured to emit light in a second spectral range for detection of internal features within the tooth (e.g., by trans-illumination, small-angle penetration imaging, laser florescence, etc., which may generically be referred to as penetration imaging, e.g., in the near-IR). Although separate illumination sources are shown in FIG. 3B, in some variations a selectable light source may be used. The light source may be any appropriate light source, including LED, fiber optic, etc. The wand 303 may include one or more controls (buttons, switching, dials, touchscreens, etc.) to aid in control (e.g., turning the wand on/of, etc.); alternatively or additionally, one or more controls, not shown, may be present on other parts of the intraoral scanner, such as a foot petal, keyboard, console, touchscreen, etc.

In general, any appropriate light source may be used, in particular, light sources matched to the mode being detected. For example, any of these apparatuses may include a visible light source or other (including non-visible) light source for surface detection (e.g., at or around 680 nm, or other appropriate wavelengths). A color light source, typically a visible light source (e.g., "white light" source of light) for color imaging may also be included. In addition a penetrating light source for penetration imaging (e.g., infrared, such as specifically near infrared light source) may be included as well.

The intraoral scanner 301 may also include one or more processors, including linked processors or remote processors, for both controlling the wand 303 operation, including coordinating the scanning and in reviewing and processing the scanning and generation of the 3D model including surface and internal features. As shown in FIG. 3B the one or more processors 313 may include or may be coupled with a memory 315 for storing scanned data (surface data, internal feature data, etc.). Communications circuitry 317, including wireless or wired communications circuitry may also be included for communicating with components of the system (including the wand) or external components, including external processors. For example the system may be configured to send and receive scans or 3D models. One or more additional outputs 319 may also be included for outputting or presenting information, including display screens, printers, etc. As mentioned, inputs 321 (buttons, touchscreens, etc.) may be included and the apparatus may allow or request user input for controlling scanning and other operations.

Any of the apparatuses and methods described herein may be used to scan for and/or identify internal structures such as cracks, caries (decay) and lesions in the enamel and/or dentin. Thus, any of the apparatuses described herein may be configured to perform scans that may be used to detect internal structures using a penetrative wavelength or spectral range of penetrative wavelengths. Also described herein are methods for detecting cracks, caries and/or lesions or other internal feature such as dental fillings, etc. A variety of penetrative scanning techniques (penetration imaging) may be used or incorporated into the apparatus, including but not limited to trans-illumination and small-angle penetration imaging, both of which detect the passage of penetrative wavelengths of light from or through the tissue (e.g., from or through a tooth or teeth).

Figure 3C:
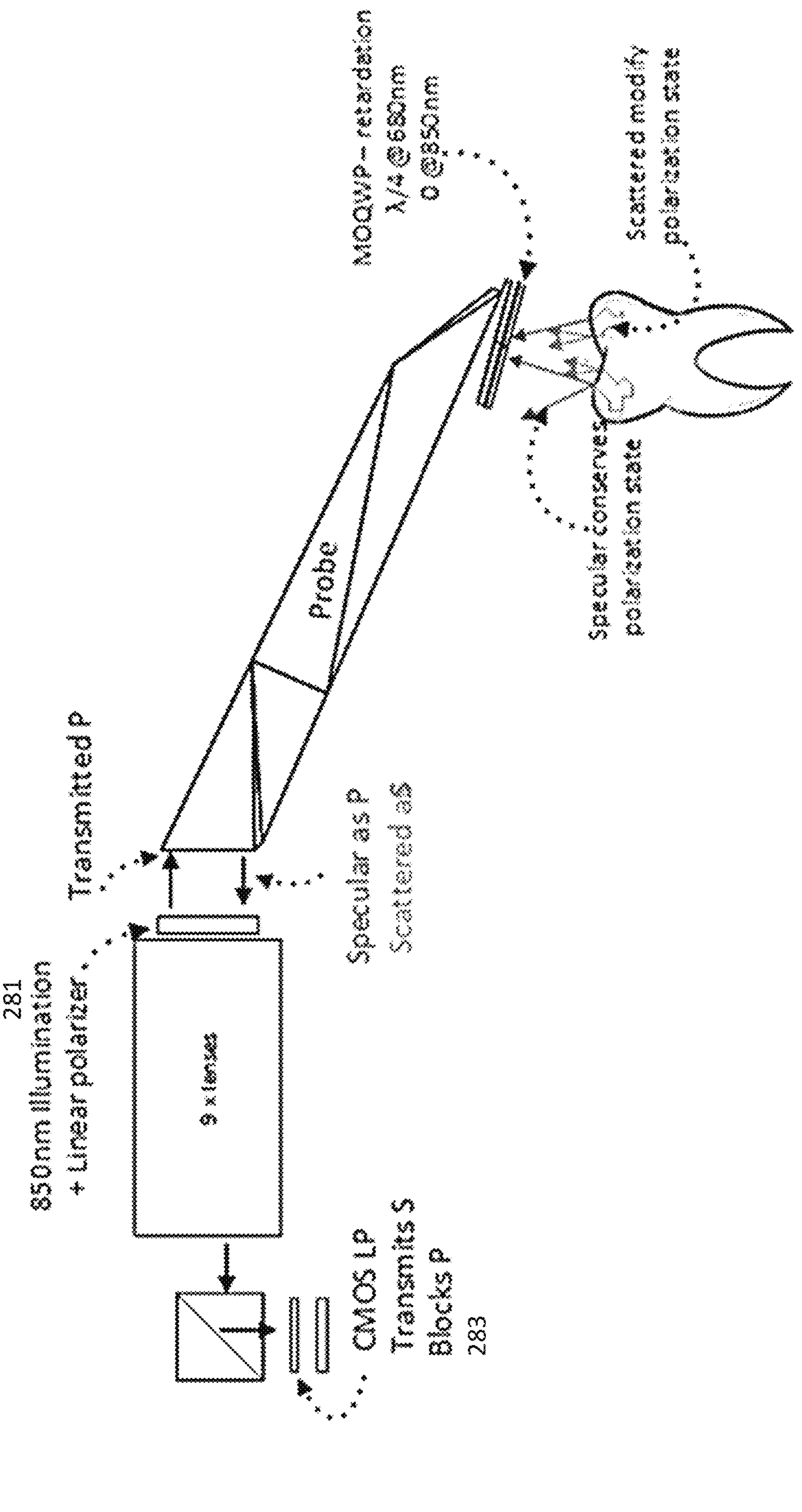
FIG. 3C shows a schematic of an intraoral scanner configured to do both surface scanning (e.g., visible light, non-penetrative) and penetrative scanning using a near infra-red (IR) wavelength. The scanner includes a polarizer and filters to block near-IR light reflected off the surface of the tooth while still collecting near-IR light reflected from internal structures.

FIG. 3C shows a schematic of an intraoral scanner configured to do both surface scanning (e.g., visible light, non-penetrative) and penetrative scanning using a near infrared (IR) wavelength. In FIG. 3C, the scanner includes a polarizer (e.g., linear polarizer 281) and filters 283 to block near-IR light reflected off the surface of the tooth while still collecting near-IR light reflected from internal structures. In this example, near-IR light is applied with a known polarization (P) (at 850 nm in this example); emitted light illuminates the tooth and specular light reflected from the surface of the tooth, e.g., the enamel, is reflected with the specular polarization state conserved. Light hitting the internal features such as the dentin may instead be scattered (S), which may modify the polarization state. Within the intraoral scanner, light returning back through the wand to the sensor (e.g., a CMOS detector) is first filtered 283 through a filter that transmits the scattered (S) light from the internal structures to the detector but does not pass specular light with the original polarization (P) to the detector. Other intraoral scanner configurations with or without polarization filters such as those shown in FIG. 3C may be used as part of the probe.

The methods, systems and/or computer readable media described herein may provide more detailed visual properties of the teeth and may also or alternatively allow automated and/or more accurate 3D restoration of the inner structure of the tooth. These benefits may enable restoration that is closer to the original teeth, while being more robust to light conditions, illumination angles, viewing angles, background, spectrum and other factors that affect the appearance of tooth implants, including restorations such as artificial teeth, caps, dentures, veneers, bridges, etc.

Reconstruction of internal as well as surface features of the teeth, e.g., using segmentation of inner regions such as the dentin and the enamel thickness, may be used as restoration lab data for generating 3D reconstructions of a tooth, teeth, or portion of a tooth or teeth. Thus, the model of a patient's teeth including internal structures (e.g., a volumetric model or data representing a volumetric model) may be converted into restoration lab data that will allow either more accurate manual formation of an implant (e.g., artificial teeth, caps, dentures, veneers, etc.) or automatic formation of an implant (e.g., by 3D printing or robotic formation).

The use of these volumetric models may facilitate the formation of implants that copy or mimic the tooth inner structure, transparency and color (hue, intensity, etc.) as part of the implant and thus optimally resemble the patient's real teeth.

In any of the methods and apparatuses for modeling the surface an internal structures described herein, the apparatuses (e.g., scanners) may be configured to concurrently record color (e.g., visible light, RGB, etc.) data from the teeth, and this color information may be included as part of the volumetric model data (e.g., the three-dimensional reconstruction). These volumetric models may be adapted to form visible light volumetric models by including volumetric visible light information.

Examples of the intraoral scanners and methods of operating them to generate the volumetric models are provided below. Penetrative images, e.g., image taken with an intraoral scanner using near-IR, may generate a volumetric model of the teeth. This volumetric model may be modified as described herein to include optical property information and may be used for construction of a dental restoration device, based on the more accurate teeth structure and optical properties provided by the visible light volumetric model engine. See, e.g., FIG. 4B, described below. Although the methods and apparatuses described herein are provided in the context of determining internal structures using near-IR or IR light, any of these methods and apparatuses, and particularly methods for modeling and constructing more accurate dental implants, may incorporate or be used with other imaging technologies that provide internal structure of the teeth, including, for example, X-ray or CBCT imaging.

When near-IR is used, the volumetric model may be formed from near IR or IR images (or any other wave-length that can penetrate the tooth surface, e.g. 800 nm, 850 nm, 900 nm, etc.) collected by the intraoral scanner. The volumetric model may include a 3D density map of the inner tooth structure, a 3D map of the optical properties of the outer surface and/or the region between the outer surface and the dentine, the dentine, etc. (e.g., for each point or voxel inside the tooth model), and optionally segmentation of different structures, e.g. the dentin, enamel, and/or the surface that separates them.

Any of the intraoral scanners described herein may be configured to capture, in real-time, the three or more imaging modes described above: e.g., surface 3D scan, RGB color capture of the tooth surface, and near-IR or IR images that are able to penetrate the tooth surface and image structures inside the teeth. This information, and particularly the penetrative images, may be used to produce a volumetric map of the tooth. The ability to capture at least these three imaging modes simultaneously or approximately simultaneously (e.g., by rapidly scanning between them may allow the production of three-dimensional models of the tooth/teeth which may be modified to include optical characteristics such as light absorption, light reflection, light transmission and/or light emission. This information may therefore be used to produce an accurate dental implants, including tooth replacements or restoratives, such as: caps, veneers, dentures, bridges, etc.

In a restorative treatment, the restorative implant (e.g., crown or bridge) may use information for shading as well as glazing the implant. The methods, systems and/or computer readable media described herein may produce one or more models of tooth internal and external structure and 3D optical properties for at least the outer surface and the region between the outer surface and the dentine.

Figure 4A:
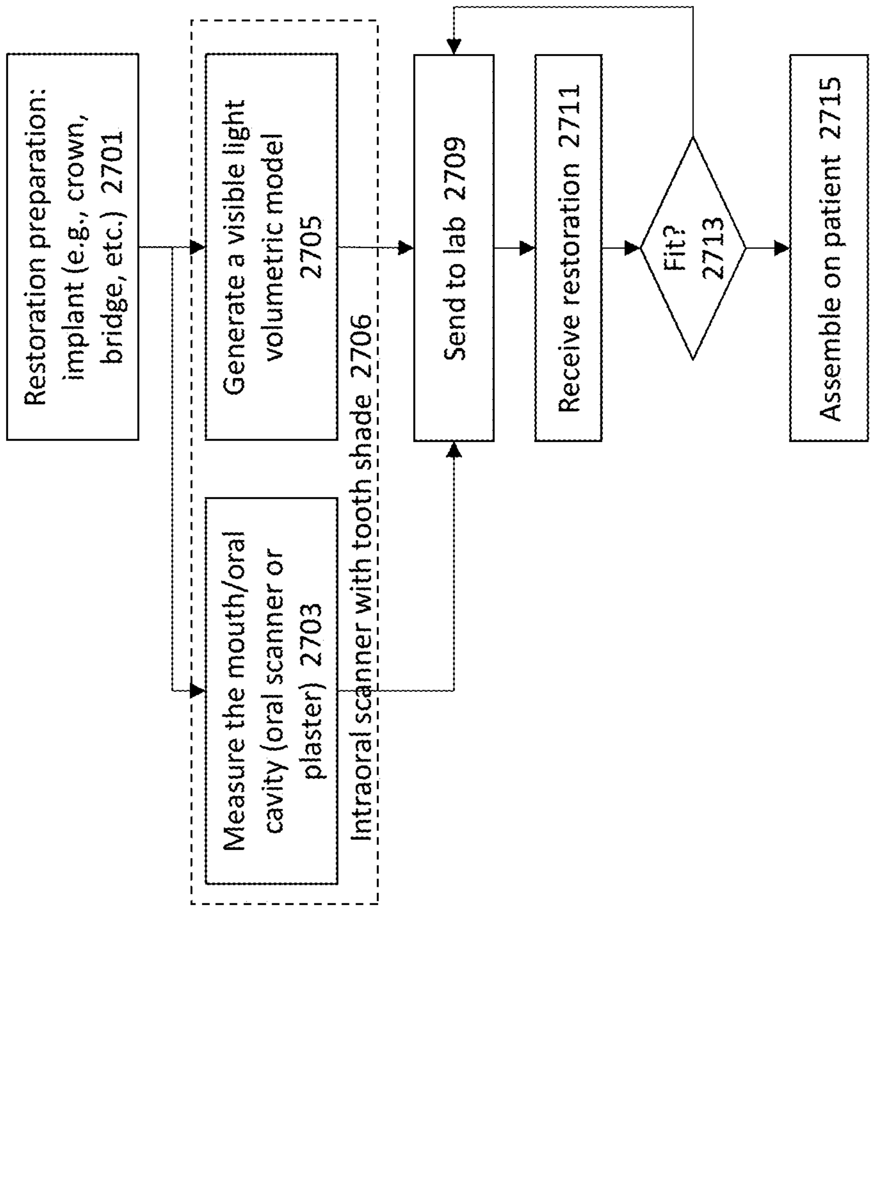
FIG. 4A illustrates a prior-art method of forming a dental implant.
Figure 4B:
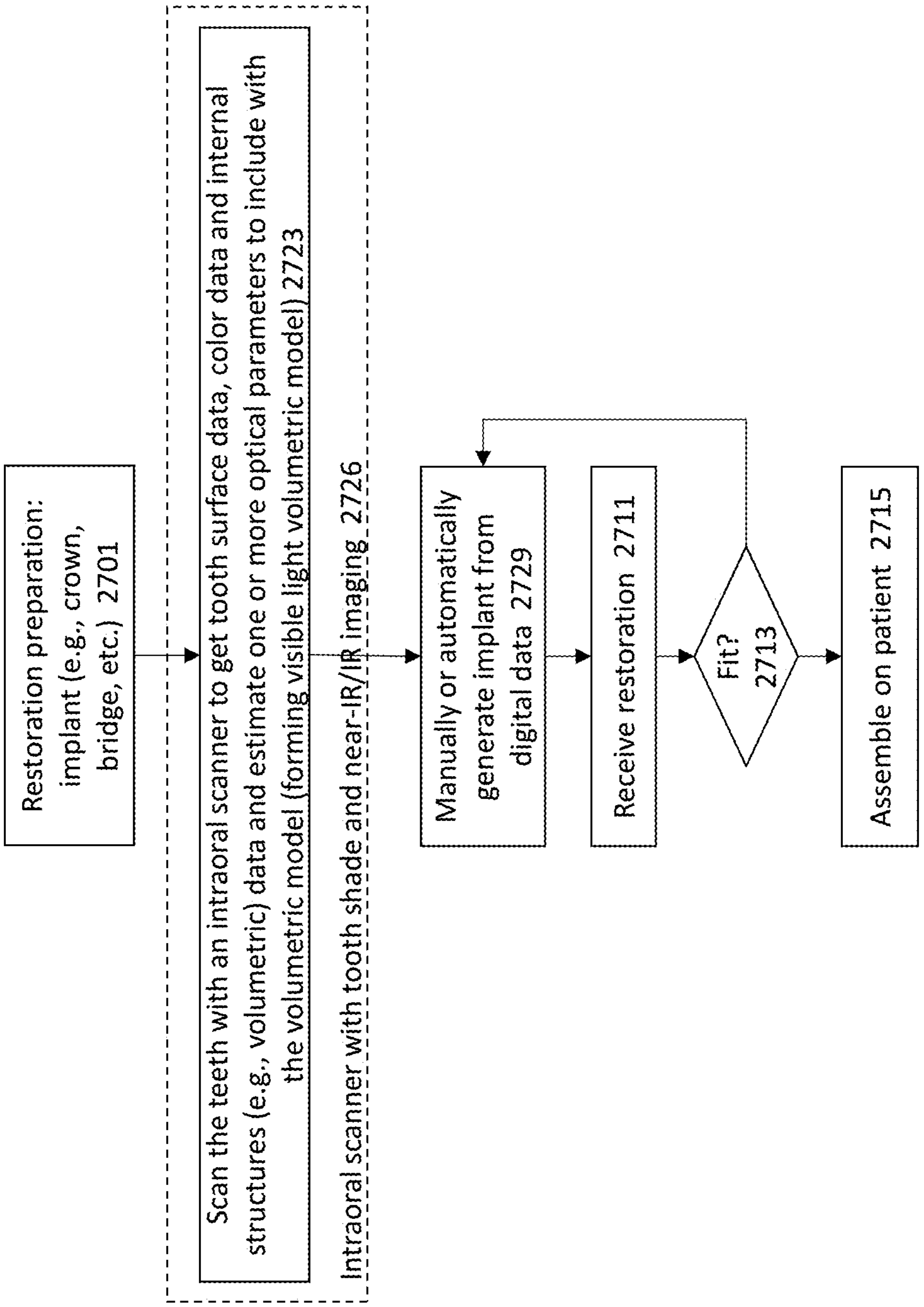
FIG. 4B illustrate a method for forming a dental implant by using an intraoral scanner operating in both non-penetrative (e.g., surface scanning and/or color scanning) wavelength and a penetrative (e.g., near-IR) wavelength to determine a visible light volumetric model, having one or more optical properties for voxels within the volume in addition to structural information about the teeth.

FIG. 4A illustrates an example of a process flow for a method of forming a dental prosthesis (e.g., a dental restoration) 2701 as currently processed. The steps may include taking measurements of the patient's teeth, including both the teeth to be modified as well as the patient's other teeth 2703. These measurements may be taken manually (e.g., using a cast of the teeth) and/or using a digital scanner (e.g., intraoral scanner). These methods may also generate, from the initial volumetric model, a visible light volumetric model 2705. After iterative settling on the optical properties as described above, the resulting optical property matching may be based on an overall impression of the tooth. Depending on how the optical properties were set/assigned initially, they may have a very limited spatial distribution. This information may all be sent to a lab 2709 to fabricate the implant 2711, which may then be checked for fit 2713 (and revised if it doesn't fit) and installed on the patient 2715.

An intraoral scanner may be used to provide the surface measurements of the patient's teeth, and may be adapted to provide optical properties for voxels within the volume.

The optical properties within the volume may be related to the thickness of the enamel, which may be readily estimated when the three-dimensional distribution of the outer surface and dentin are known. Thus, the optical properties information may be combined with the shape and/or visible light information from the original volumetric model of the teeth. As described in FIG. 4B, a restoration implant may be prepared 2701 using an intra-oral scanner 2726 providing both volumetric mapping of scanned teeth that includes data for 3D dimensions and optical properties; this information may be used directly (digitally) to form the implant, or it may be sent to a lab 2729 to form the implant from the data. The implant may then be checked for fit 2713 (and revised if it doesn't fit) and installed on the patient 2715.

The use of near-IR and/or IR data to enhance the volumetric data of the scanned teeth allows the correlation of optical properties within the volumetric model (or in a separate data structure correlated with the volumetric model).

In practice, a lab may receive information of 3D measurement requirements of the as well as information about their optical properties within the volume. The intraoral scanner (IOS) may be configured to acquire 3D and tooth optical properties automatically.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present.

In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A non-transitory computer readable medium storing instructions for execution by a processor for preparing a dental restoration having optical properties matching optical properties of a patient's tooth, wherein the instructions, when executed, cause the processor to:

generate a volumetric model of at least a portion of the patient's tooth from a three-dimensional (3D) intraoral scan including both near-IR wavelength data and visible light wavelength data, wherein the volumetric model includes a representation of an outer surface of the patient's tooth and an internal structure of a region of enamel extending from the outer surface of the patient's tooth to the patient's dentine;

estimate values for one or more of: light absorption, light reflection, light transmission, and light scattering of one or more visible light wavelengths for voxels defining the outer surface of the patient's tooth and the region of enamel extending from the outer surface of the patient's tooth to the patient's dentine based on optical properties of the volumetric model generated by the 3D intraoral scan; and generate a visible light volumetric model from the volumetric model by assigning the estimated values to voxels of the visible light volumetric model that correspond to the volumetric model.

2. The non-transitory computer readable medium of claim 1, wherein the instructions cause the processor to form the dental restoration from the visible light volumetric model.

3. The non-transitory computer readable medium of claim 1, wherein the instructions cause the processor to make the dental restoration by generating instructions for making the dental restoration from the visible light volumetric model wherein the dental restoration has surface and internal optical properties derived from the visible light volumetric model.

4. The non-transitory computer readable medium of claim 1, wherein the instructions cause the processor to receive the volumetric model of at least the portion of the patient's tooth, wherein the volumetric model comprises a plurality of voxels defining the outer surface of the patient's tooth and the region of enamel extending from the outer surface of the patient's tooth to the patient's dentine.

5. The non-transitory computer readable medium of claim 1, wherein the instructions cause the processor to estimate values for two or more of: light absorption, light reflection, light transmission, and light scattering for each of the voxels defining the outer surface of the patient's tooth and the region of enamel extending from the outer surface of the patient's tooth to the patient's dentine.

6. The non-transitory computer readable medium of claim 1, wherein the instructions cause the processor to estimate values for one or more of: light absorption, light reflection, light transmission, and light scattering at three or more visible light wavelengths for each of the voxels defining the outer surface of the patient's tooth and the region of enamel extending from the outer surface of the patient's tooth to the patient's dentine.

7. The non-transitory computer readable medium of claim 6, wherein the three or more visible light wavelengths include one or more red, green and blue wavelength.

8. The non-transitory computer readable medium of claim 1, wherein the instructions cause the processor to estimate the value for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine by setting the value to a predetermined prior value.

9. The non-transitory computer readable medium of claim 1, wherein the instructions cause the processor to set the values for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine to a predetermined prior value determined by parametric estimation.

10. The non-transitory computer readable medium of claim 1, wherein the instructions cause the processor to estimate the value for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine by iterating to determine the value that approximates optical properties based on a position of a camera and the reconstructed volume compared to RGB data recorded when scanning the patient's teeth with an intraoral scanner to generate the volumetric model.

11. The non-transitory computer readable medium of claim 1, wherein the instructions cause the processor to estimate the value for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine by setting the value to a predetermined prior value determined from a population of representative patients, wherein the prior value is selected using one or more of: measured RGB data recorded when scanning the patient's teeth with an intraoral scanner to generate the volumetric model, volume information, and patient information.

12. The non-transitory computer readable medium of claim 11, wherein volume information comprises path length from the surface of the tooth to the dentin through the enamel.

13. The non-transitory computer readable medium of claim 11, wherein the patient information comprises one or more of: patient age, gender, estimated jaw shape.

14. The non-transitory computer readable medium of claim 1, wherein the instructions cause the processor to divide the volumetric model into a plurality of sub-regions before estimating the value for one or more of: light absorption, light reflection, light transmission, and light scattering of one or more visible light wavelengths for the outer surface of the patient's tooth and the region of enamel extending from the outer surface of the patient's tooth to the patient's dentine.

15. A non-transitory computer readable medium storing instructions for execution by a processor for preparing a dental restoration having optical properties matching optical properties of a patient's tooth, wherein the instructions, when executed, cause the processor to:

form a visible light volumetric model from intraoral scan data, the intraoral scan data comprising near-infrared (NIRI) data, wherein the visible light volumetric model is formed by:

estimating values for one or more of: light absorption, light reflection, light transmission, and light scattering of one or more visible light wavelengths, for voxels of the visible light volumetric model associated with the region of enamel extending from the outer surface of the patient's tooth to the patient's dentine based on NIRI data based on optical properties of the patient's tooth determined from the intraoral scan data; and estimating values for one or more of: light absorption, light reflection, light transmission, and light scattering of one or more visible light wavelengths, for voxels of the visible light volumetric model associated with the outer surface of the patient's tooth based on visible light wavelength data based on the optical properties of the patient's tooth determined from the intraoral scan data; and form the dental restoration from the visible light volumetric model.

16. A system, the system comprising:

an intraoral scanner;

one or more processors; and a memory comprising instructions for execution by the one or more processors for preparing a dental restoration having optical properties matching optical properties of a patient's tooth, wherein the instructions, when executed, cause the one or more processors to:

generate a volumetric model of at least a portion of the patient's tooth from a three-dimensional (3D) intraoral scan including both near-IR wavelength data and visible light wavelength data, wherein the volumetric model includes a representation of an outer surface of the patient's tooth and an internal structure of a region of enamel extending from the outer surface of the patient's tooth to the patient's dentine;

estimate values for one or more of: light absorption, light reflection, light transmission, and light scattering of one or more visible light wavelengths for voxels defining the outer surface of the patient's tooth and the region of enamel extending from the outer surface of the patient's tooth to the patient's dentine based on optical properties of the volumetric model generated by the 3D intraoral scan; and generate a visible light volumetric model from the volumetric model by assigning the estimated values to voxels of the visible light volumetric model that correspond to the volumetric model.

17. The system of claim 16, wherein the instructions cause the one or more processors to form the dental restoration from the visible light volumetric model.

18. The system of claim 16, wherein the instructions cause the one or more processors to make the dental restoration by generating instructions for making the dental restoration from the visible light volumetric model wherein the dental restoration has surface and internal optical properties derived from the visible light volumetric model.

19. The system of claim 16, wherein the instructions cause the one or more processors to receive the volumetric model of at least the portion of the patient's tooth, wherein the volumetric model comprises a plurality of voxels defining the outer surface of the patient's tooth and the region of enamel extending from the outer surface of the patient's tooth to the patient's dentine.

20. The system of claim 16, wherein the instructions cause the one or more processors to estimate the value for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine by setting the value to a predetermined prior value.

21. The system of claim 16, wherein the instructions cause the one or more processors to set the values for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine to a predetermined prior value determined by parametric estimation.

22. The system of claim 16, wherein the instructions cause the one or more processors to estimate the value for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine by iterating to determine the value that approximates optical properties based on a position of a camera and the reconstructed volume compared to RGB data recorded when scanning the patient's teeth with an intraoral scanner to generate the volumetric model.

23. The system of claim 16, wherein the instructions cause the one or more processors to estimate the value for one or more of: light absorption, light reflection, light transmission, and light scattering of one or more visible light wavelengths for each of the voxels defining the outer surface of the patient's tooth and the region of enamel extending from the outer surface of the patient's tooth to the patient's dentine by setting the value to a predetermined prior value determined from a population of representative patients, wherein the prior value is selected using one or more of: measured RGB data recorded when scanning the patient's teeth with an intraoral scanner to generate the volumetric model, volume information, and patient information.

24. The system of claim 16, wherein the instructions cause the one or more processors to divide the volumetric model into a plurality of sub-regions before estimating the value for one or more of: light absorption, light reflection, light transmission, and light scattering of one or more visible light wavelengths for the outer surface of the patient's tooth and the region of enamel extending from the outer surface of the patient's tooth to the patient's dentine.

* * * * *